(12) United States Patent
Lai

(10) Patent No.: US 7,114,603 B2
(45) Date of Patent: Oct. 3, 2006

(54) EXTENSION CORD HOLDER

(76) Inventor: Li-Chun Lai, 21F-1, No. 33, Sec.1, Minsheng Rd., Panciao City, Taipei County (TW)

( * ) Notice: Subject to any disclaimer, the term of this patent is extended or adjusted under 35 U.S.C. 154(b) by 126 days.

(21) Appl. No.: 11/001,077

(22) Filed: Dec. 2, 2004

(65) Prior Publication Data

US 2006/0118377 A1    Jun. 8, 2006

(51) Int. Cl.
*H02G 11/02* (2006.01)
(52) U.S. Cl. .............................. 191/12.4; 191/12.2 R; 362/258; 439/501; 242/405
(58) Field of Classification Search ........... 191/12.2 R, 191/12.4; 174/50, 59; 242/388, 388.6, 405, 242/405.1; 362/258; 439/501
See application file for complete search history.

(56) References Cited

U.S. PATENT DOCUMENTS

| | | | | |
|---|---|---|---|---|
| 3,733,478 | A * | 5/1973 | Barker | 362/387 |
| 4,656,320 | A * | 4/1987 | Maddock | 191/12.4 |
| 4,725,697 | A * | 2/1988 | Kovacik et al. | 191/12.4 |
| D432,084 | S * | 10/2000 | Miller | D13/137.4 |
| 6,170,775 | B1 * | 1/2001 | Kovacik et al. | 242/404 |
| 6,273,354 | B1 * | 8/2001 | Kovacik et al. | 242/404 |

\* cited by examiner

Primary Examiner—Mark T. Le
(74) Attorney, Agent, or Firm—Rosenberg, Klein & Lee

(57) ABSTRACT

An extension cord holder is provided. The extension cord holder has a main body. A first holding portion and a second holding portion are disposed on the two sides of the main body, and these two portions are in communication with each other. A first wheel assembly and a second wheel assembly are held in the first holding portion and the second holding portion, respectively. A first extension cord is wound around the first wheel assembly. One end of the first extension cord is electrically connected with a switch and a multiple of sockets disposed on the first wheel assembly. A plug is provided on the other end of the first extension cord. The plug protrudes out of an opening provided on a lower portion of the rear side of the body. A second extension cord is wound around the second wheel assembly. One end of the second extension cord is electrically connected with the first extension cord; the other end of the second extension cord is electrically connected with an electrical device, which protrudes out of the front side of the body. These two wheel assemblies are independently operated: when the first wheel assembly is rotated, the second wheel assembly is not rotated along with it. Hence, the first and second extension cords are independently operated. Whence, after the plug is inserted in a wall socket, power is fed to the first extension cord, the sockets provided on the first wheel assembly, the second extension cord and the electrical device, which may then be powered up and ready for use; in addition, a user may draw power from the sockets provided on the first wheel assembly.

10 Claims, 7 Drawing Sheets

EXTENSION CORD HOLDER

BACKGROUND OF THE INVENTION

1. Field of the Invention

The invention generally relates to an extension cord holder. More particularly, the invention relates to an extension cord holder, wherein (1) The extension cord holder has a first wheel assembly and a second wheel assembly, and the wheel assemblies are independently operated (2) A first extension cord and a second extension cord are wound around the first wheel assembly and the second wheel assembly, respectively (3) A plug is provided on the input end of the first extension cord, and an electrical device is connected with the output end of the second extension cord (4) The first extension cord is electrically connected with the second extension cord so that power may be fed to the electrical device through the plug, the first extension cord and the second extension cord.

2. Description of the Prior Art

An extension cord holder of the prior art has such a simple design: (1) With a housing (2) A wheel assembly is disposed in the housing (3) An opening is disposed on the wheel assembly so that power may be fed from an extension cord to several sockets disposed on the outer surface of the wheel assembly (4) A user may retract the wheel assembly by turning a knob provided on the wheel assembly (5) A plug is provided on one end of the extension cord (6) A user may pull out the plug and insert the plug into a wall socket so that power may be fed to the sockets on the wheel assembly and then to an electrical product plugged in one of these sockets. However, such extension cord holder is like a larger version of an extension cord and an electrical product has to be plugged in one of these sockets so as to get the electrical product powered up. The design of such extension cord holder needs improvements so as to provide additional functions.

Hence, the extension cord holder of the prior art has many disadvantages and its design needs improvements.

To eliminate these disadvantages, the inventor has put in many years of effort in the improvements and has come up with the extension cord holder of the present invention.

SUMMARY OF THE INVENTION

The first object of the present invention is to provide such an extension cord holder: (1) A first wheel assembly and a second wheel assembly are provided on the two sides of the main body of the extension cord holder (2) These two assemblies are independently operated: when the first wheel assembly is rotated, the second wheel assembly is not rotated so as to provided a different function.

The second object of the present invention is to provide such an extension cord holder: (1) A first extension cord and a second extension cord are wound around the first wheel assembly and the second wheel assembly, respectively (2) A plug is provided at one end of first extension cord and one end of second extension cord is connected with an electrical device so that power may be fed through the plug to the electrical device and hence that the electrical device may be powered up.

Hence, the extension cord holder of the present invention has a main body. A first holding portion and a second holding portion are disposed on the two sides of the body and are in communication with each other. A first wheel assembly is held in the first holding portion. A switch and a multiple of sockets are disposed on the first wheel assembly. A first extension cord is wound around the first wheel assembly. One end of the first extension cord is electrically connected with the switch and sockets disposed on the first wheel assembly. A plug is provided on the other end of the first extension cord. The plug protrudes out of an opening provided on a lower portion of the rear side of the body. A second extension cord is wound around the second wheel assembly. One end of the second extension cord is electrically connected with the first extension cord; the other end of the second extension cord is electrically connected with an electrical device, which protrudes out of the front side of the body. These two wheel assemblies are independently operated: when the first wheel assembly is rotated, the second wheel assembly is not rotated with it; also, when the second wheel assembly is rotated, the first wheel assembly is not rotated with it. Hence, the first and second extension cords are independently operated. Whence, after the plug is inserted in a wall socket, power is fed to the first extension cord, the sockets provided on the first wheel assembly, the second extension cord and the electrical device, which may then be powered up; in addition, a user may draw power from the sockets provided on the first wheel assembly. Also, the second extension cord allows the electrical device to be used at a further location.

These features and advantages of the present invention will be fully understood and appreciated from the following detailed description of the accompanying Drawings.

DETAILED DESCRIPTION OF THE PREFERRED EMBODIMENT

Figures 1, 1A:
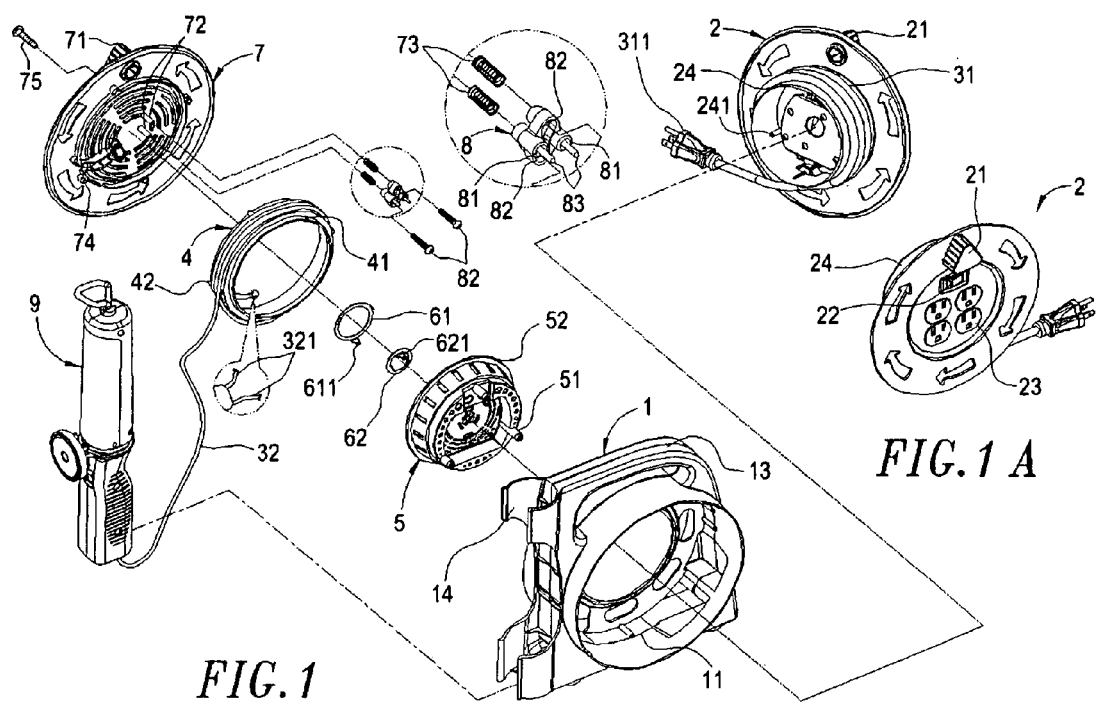
FIG. 1 is an exploded view of the extension cord holder of the present invention.
FIG. 1A is a front view of the first wheel assembly of the extension cord holder of the present invention.
Figure 2:
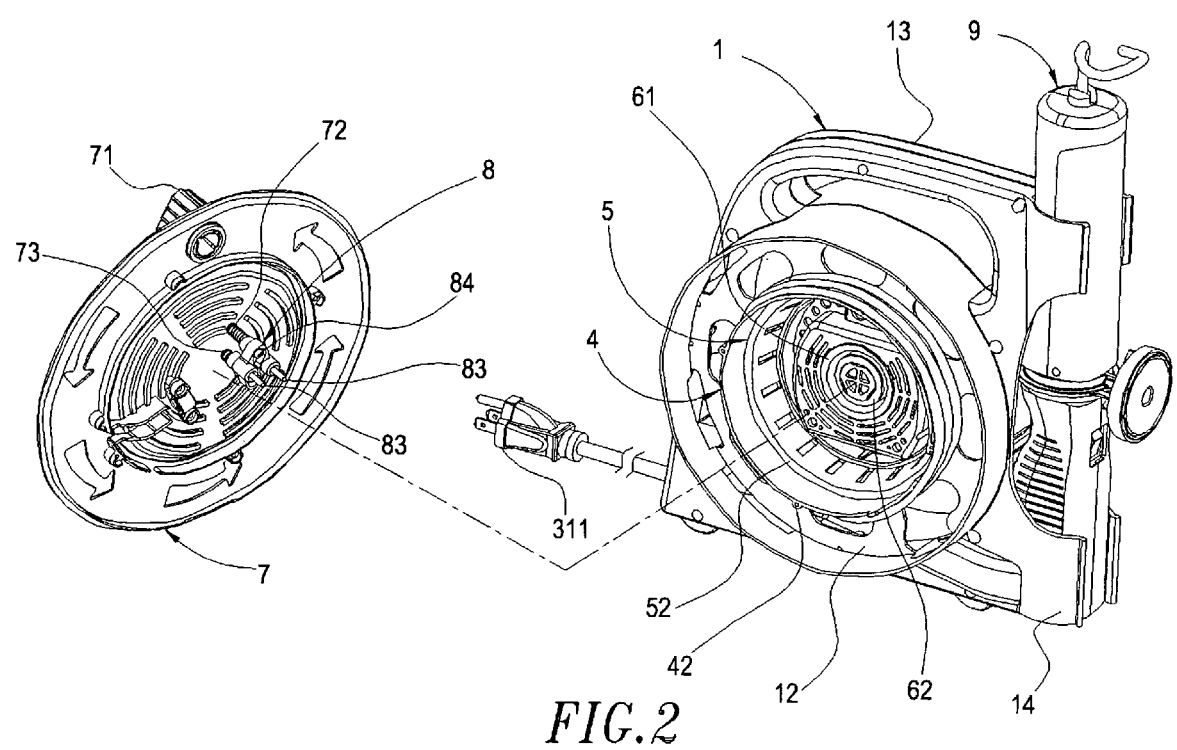
FIG. 2 is a view of the extension cord holder of the present invention, showing how the extension cord holder is assembled.
Figure 3:
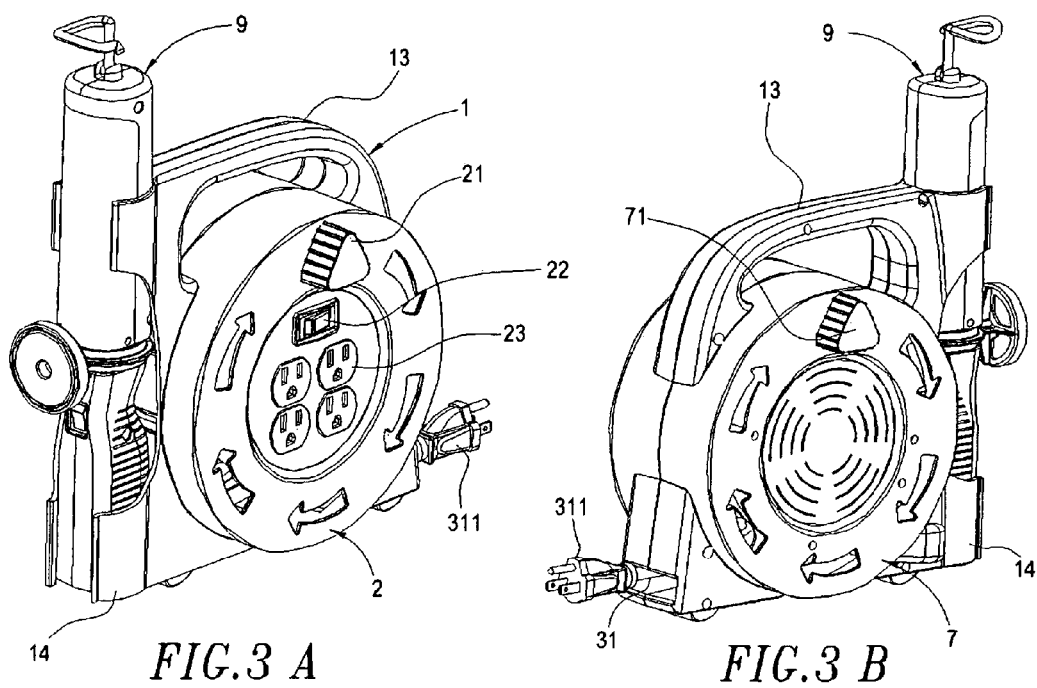
FIGS. 3A and 3B are two perspective views of the extension cord holder of the present invention.
Figure 4:
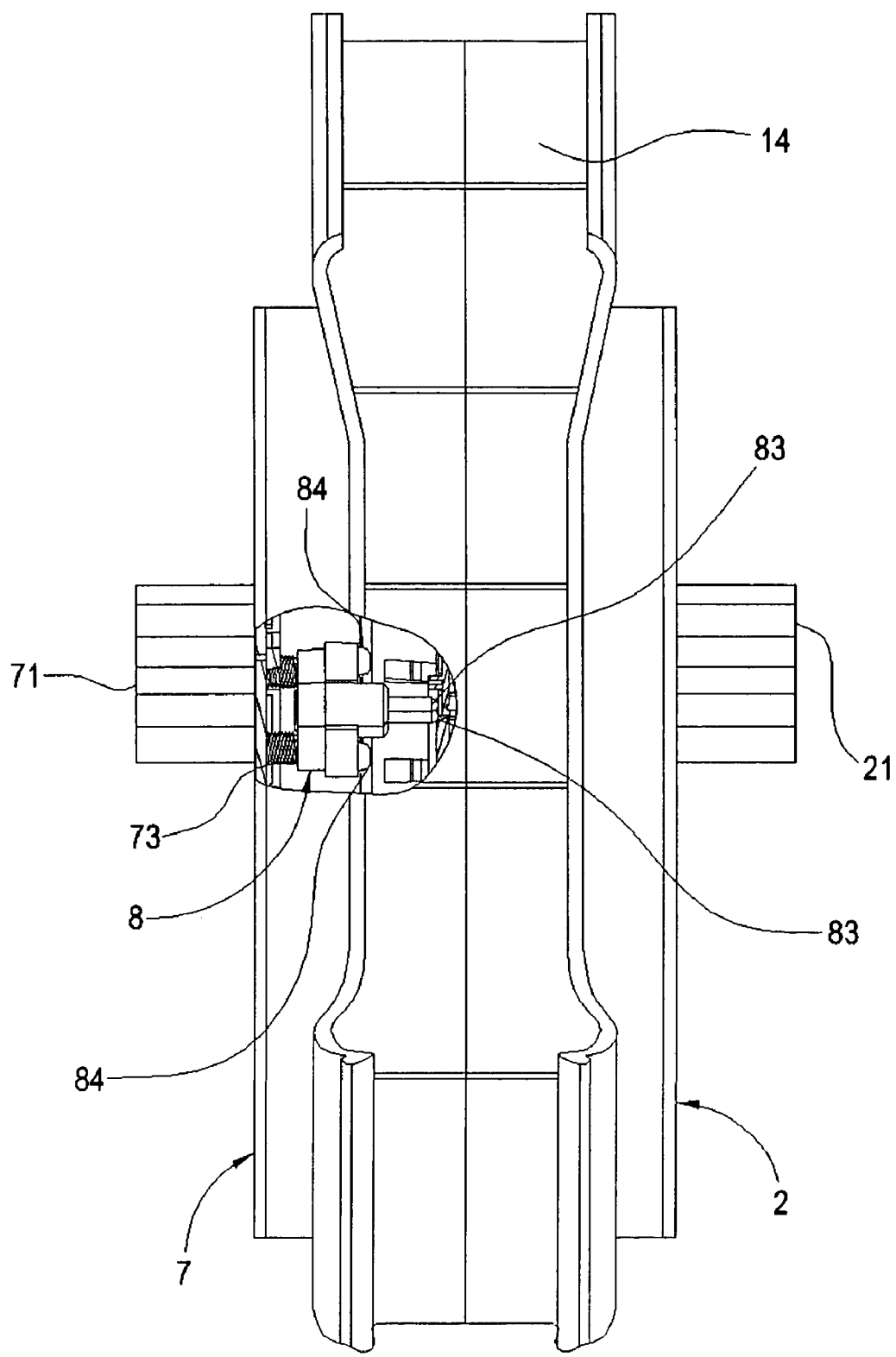
FIG. 4 is a cross-sectional view of the extension cord holder of the present invention.

As illustrated in FIGS. 1, 2, 3 and 4, the extension cord holder of the present invention comprises a main body 1, a first wheel assembly 2, a wheel 4, a positioning assembly 5, a second wheel assembly 7, an electrically conducting assembly 8 and a second extension cord 32.

The main body 1 has a first holding portion 11 and a second holding portion 12; the two holding portions are in communication with each other. A handle 13 is disposed on top of the body 1 so that a user may use the handle 13 to carry the extension cord holder. A holding portion 14 is provided on the front side of the body 1. An opening is provided on a lower part of the front side of the main body 1, and another opening is provided on a lower part of the rear side of the main body 1.

A knob piece 21 is provided on the outer surface of the first wheel assembly 2. A switch 22 and a multiple of sockets 23 are disposed on the outer surface of the first wheel assembly 2. A hollow cylinder 24 is provided on the back side of the first wheel assembly 2. A multiple of hollow positioning rods 241 are provided inside the hollow cylinder 24. A thread is provided on the inner surface of each of these hollow positioning rods 241. A first extension cord 31 is wound around the outer surface of the hollow cylinder 24. One end of the first extension cord 31 is electrically connected with the switch 22 and the sockets 23 (not shown in the figures) so that power may be fed to the sockets 23 and that the switch 22 may be used to turn on and turn off the power. A plug 311 is provided on the other end of the first extension cord 31. The first wheel assembly 2 is held in the first holding portion 11 of the body 1 so that the cylinder 24 and the first extension cord 31 are held in the first holding portion 11 of the body 1. The plug 311 protrudes out of the opening on the lower portion of the rear side of the body 1 (as shown in FIG. 3B).

A circular edge 41 is formed on the wheel 4. Also, a multiple of threaded holes are provided on the periphery of the wheel 4. The wheel 4 is placed in the space between the first holding portion 11 and the second holding portion 12 so that the edge 41 presses against a wall edge 121 of the second holding portion 12.

A multiple of hollow rods 51 are provided on the positioning assembly 5. A circular edge 52 is provided on the outer side. A first electrically conducting ring 61 and a second electrically conducting ring 62 are provided; these two rings 61 and 62 have different sizes and do not have contact with each other. Also, two insertion pieces 611 and 621 are disposed on these two rings 61 and 62, respectively, extend through the bottom side of the positioning assembly 5. The positioning assembly 5 is placed in the space between the first holding portion 11 and the second holding portion 12 so that the circular edge 52 presses against the edge 41 of the wheel 4 and that the hollow rods 51 are aligned with the hollow positioning rods 241 of the first wheel assembly 2. Via screws 53, the positioning assembly 5 is fastened to the first wheel assembly 2, and hence the former may move along with the latter. Also, one end of the first extension cord 31 is connected with the two insertion pieces 611 and 621 of the two rings 61 and 62 so that the two rings 61 and 62 are electrically connected with the switch 22 and the sockets 23 and that power may be fed to the two rings 61 and 62.

A knob piece 71 is provided on the outer surface of the second wheel assembly 7. Two fixing rods 72 are provided near the center of the inner surface of the second wheel assembly 7. A spring 73 is disposed on each of the two fixing rods 72. A multiple of holes 74 are provided on the inner surface of the second wheel assembly 7.

Positioning holes 81 are provided on the front side and back side of the electrically conducting assembly 8. Right and left holes 82 are provided on the right and left sides. Two electrically conducting prongs 83 are provided on the electrically conducting assembly 8 and extend beyond the positioning holes 81. The two fixing rods 72 of the second wheel assembly 7 are inserted into the right and left holes 82 of the electrically conducting assembly 8, and, with the screws, the former may be fixedly connected with the latter. Because the springs 73 disposed on the two fixing rods 72 may be contracted, pressure may be exerted on the second wheel assembly 7.

The second extension cord 32 is wound around the wheel 4. One end 321 of the second extension cord 32 is connected with the two electrically conducting prongs 83 of the electrically conducting assembly 8; the other end of the second extension cord 32 is connected with an electrical device 9 (such as a lamp), which is held by the holding portion 14 provided on the front side of the body 1.

The second wheel assembly 7 is held in the second holding portion 12 of the body 1 so that the holes 74 are aligned with the holes 42 of the wheel 4 and that the second wheel assembly 7 may be fixedly connected with the wheel 4 via screws 75 and hence that the wheel 4 mat move along with the second wheel assembly 7. Also, the front ends of the two electrically conducting prongs 83 of the electrically conducting assembly 8 may press against the first and second electrically conducting rings 61 and 62 so that power in the first extension cord 31 may be fed to the second extension cord 32 via the electrically conducting prongs 83. An inward pressure may cause the two springs 73 disposed on the two fixing rods 72 to compress; such compression of the springs 73 ensures that the two electrically conducting prongs 83 have uninterrupted contact with the first and second electrically conducting rings 61 and 62 and that power is uninterruptedly fed to the second extension cord.

Figure 5:
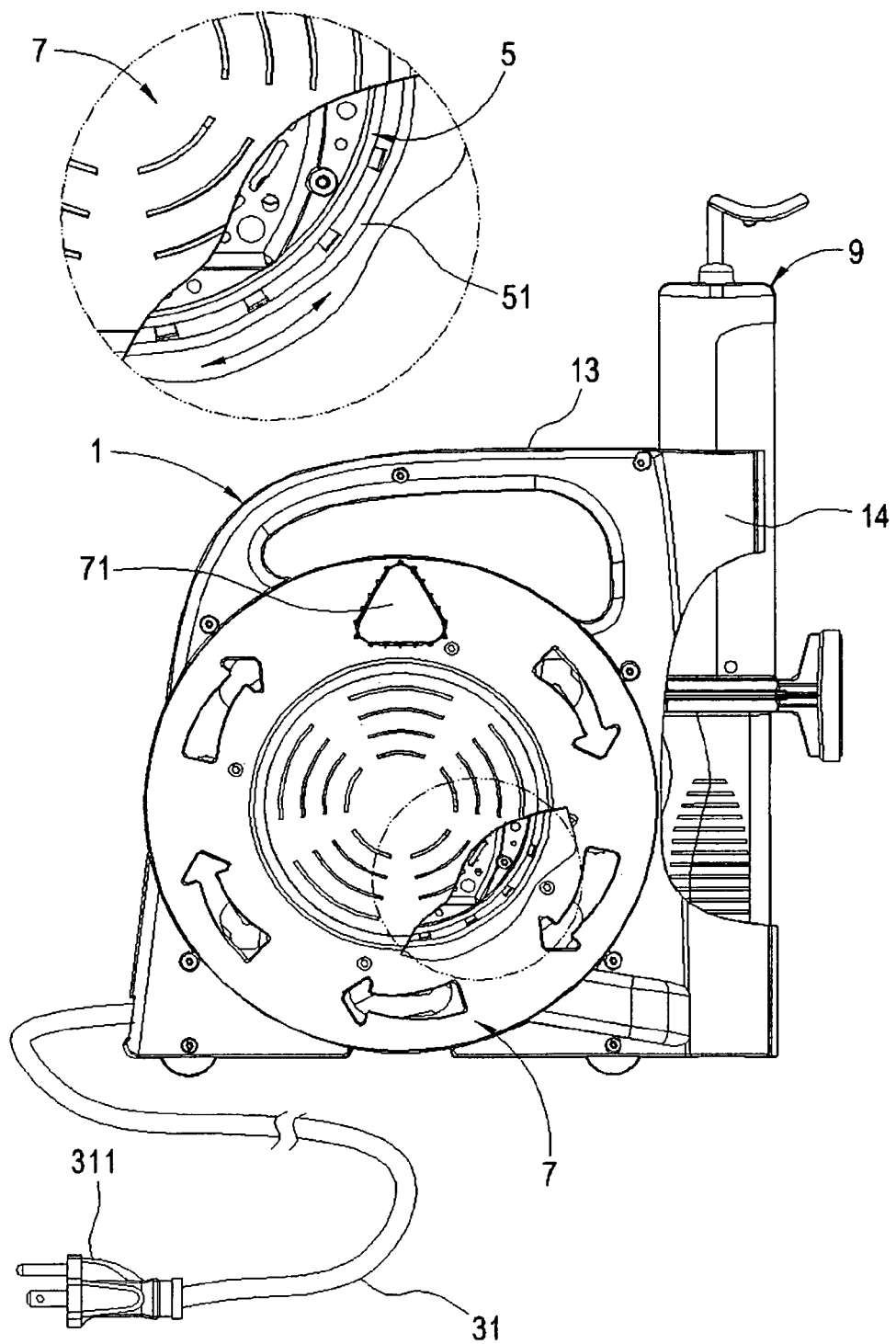
FIGS. 5A and 5B are two views of the extension cord holder of the present invention, illustrating how the extension cord holder is used.
Figure 5:
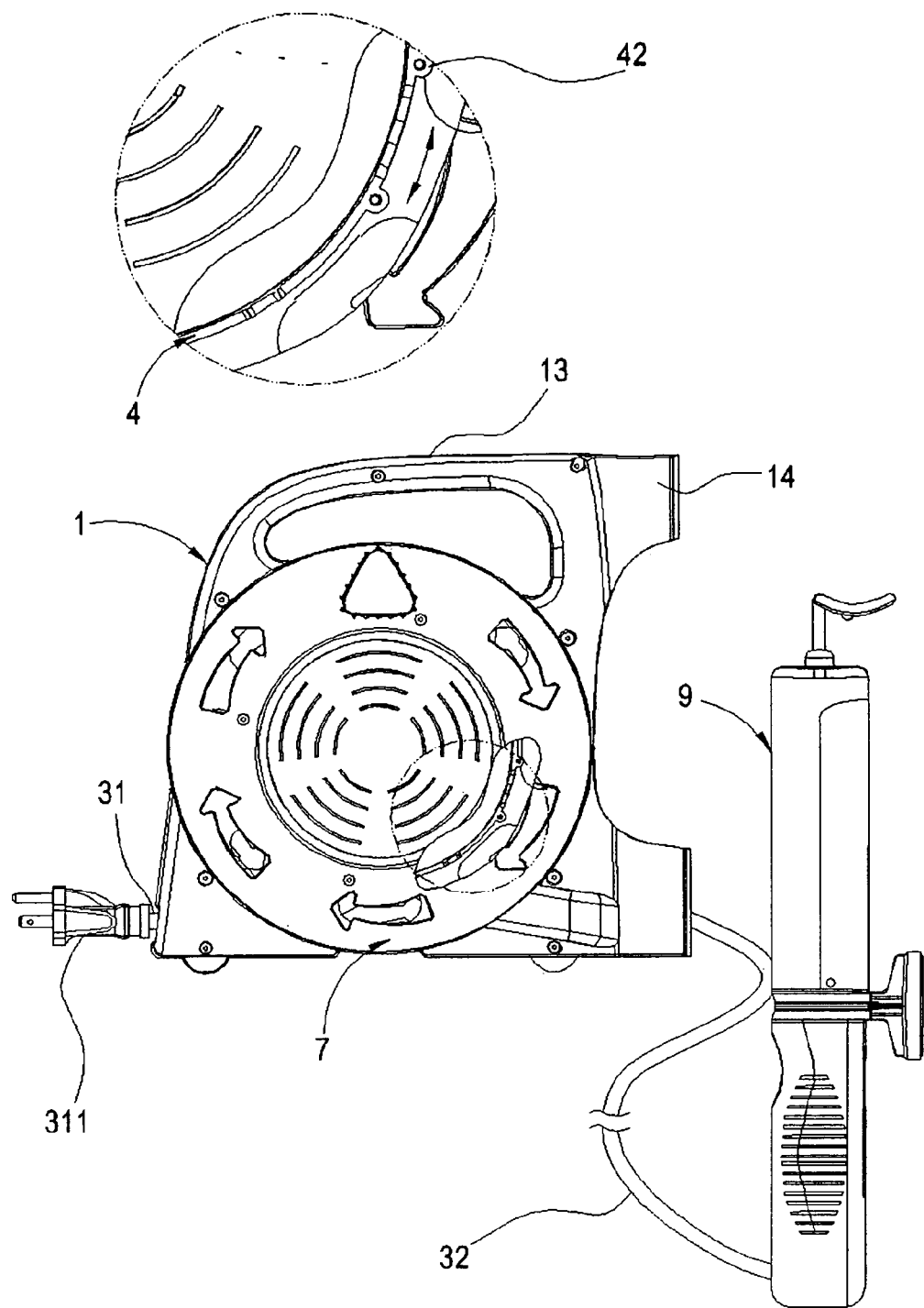
Figure 6:
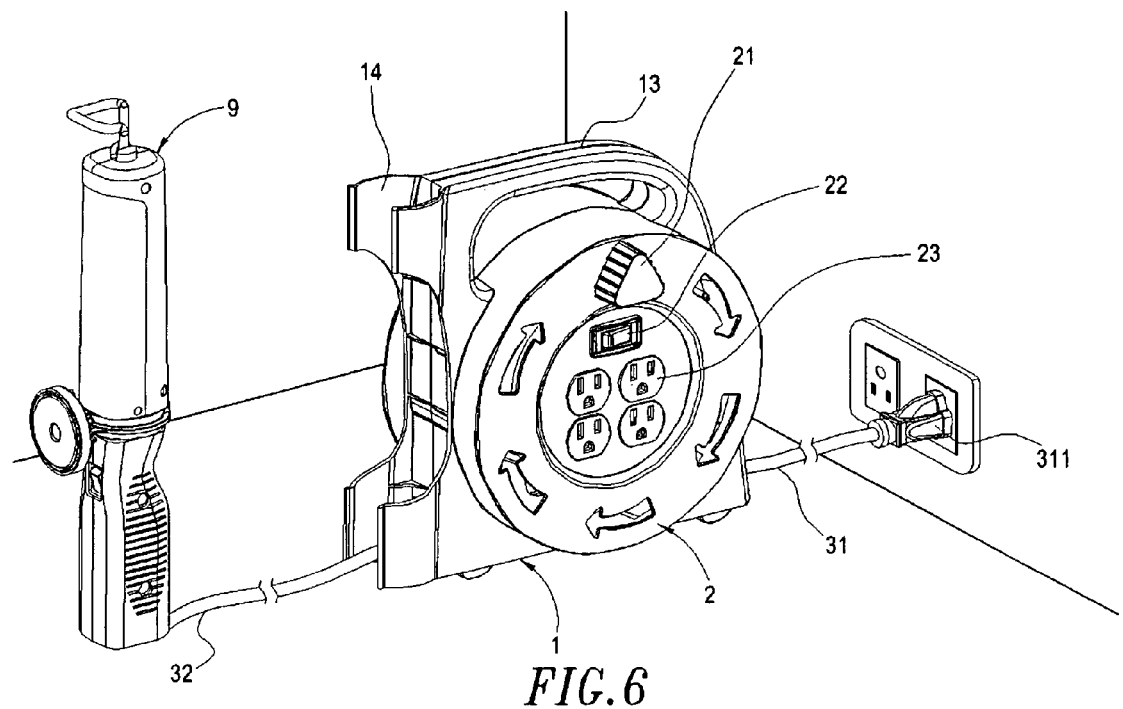
FIG. 6 is a perspective view of the extension cord holder of the present invention, illustrating how the extension cord holder is used.

FIGS. 5A, 5B and 6 illustrate how the extension cord holder of the present invention is used. First, a user pulls the plug 311 of the first extension cord 31 out of the body 1; now, the first wheel assembly 2 rotates with such pull, but the second wheel assembly 7 and the wheel 4 do not rotate with such pull. Then, the user inserts the plug 311 into a socket 10 on a wall or of another power source. Now, power is fed to the switch 22 of the first wheel assembly 2, the sockets 23 and the first and second electrically conducting rings 61 and 62 so that the sockets 23 are powered up and ready to be used. Also, power is further fed to the second extension cord 32 through the two electrically conducting prongs 83 of the electrically conducting assembly 8 and then fed to the electrical device 9 so that the electrical device 9 may be powered up and ready for use. In addition, the second extension cord 32 allows the electrical device 9 to be pulled out off the main body 1; when the electrical device 9 is pulled out, the second wheel assembly 7 and the wheel 4 rotates along with the pull, but the first wheel assembly 2 and the positioning assembly 5 does not rotate along with the pull.

To retract the first extension cord 31, the user may rotate the first wheel assembly 2 by turning the knob piece 21; now, the positioning assembly 5 is rotated and hence first extension cord 31 may be retracted and be wound around the hollow cylinder 24 of the first wheel assembly 2. To retract the first extension cord 32, the user may rotate the second wheel assembly 7 by rotating the knob piece 71; now, the wheel 4 is rotated and hence second extension cord 32 may be retracted and be wound around the wheel 4.

In contrast to the extension cord holder of the prior art, the extension cord holder of the present invention has the following two advantages:

1. A first wheel assembly and a second wheel assembly are provided on the two sides of the main body, and these two assemblies are independently operated: when the first wheel assembly is rotated, the second wheel assembly is not rotated along with it so as to provided a different function.
2. A first extension cord and a second extension cord are wound around the first wheel assembly and the second wheel assembly, respectively. A plug is provided at one end of first extension cord, and one end of second extension cord is connected with an electrical device so that power may be fed through the plug to the electrical device and hence the electrical device may be powered up and ready for use.

Although a preferred embodiment of the present invention has been described in detail hereinabove, it should be clearly understood that many variations and modifications of the basic inventive concepts herein taught which may appear to those skilled in the present art will fall within the spirit and scope of the present invention, as defined in the appended claims.

From the above, we can see that the extension cord holder of the present invention has a new design and the aforesaid advantages in practical applications. The relevant patent requirements have been met, and your approval of this patent application would be very much appreciated.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An extension cord holder, comprising:
    a main body, which has a first holding portion and a second holding portion;
    a first wheel assembly, which is held in the first holding portion, wherein a multiple of sockets are disposed on an outer surface of the first wheel assembly, a first extension cord is wound around the first wheel assembly, one end of the first extension cord is electrically connected with the sockets so that power may be fed to the sockets, a plug is provided on the other end of the first extension cord, the plug protrudes out of a lower portion on the rear side of the main body;
    a wheel, wherein a circular edge is formed on an outer side of the wheel, the outer circular edge of the wheel presses against a wall edge of the second holding portion so that the wheel is fixedly positioned in the body, a second extension cord is wound around the wheel, one end of the second extension cord is connected with an electrical device, which protrudes out of the front side of the body;
    a positioning assembly, wherein a circular edge is provided on an outer side of the positioning assembly, two electrically conducting rings of different sizes are provided, the positioning assembly is placed in the main body so that its circular edge presses against an inner circular edge of the wheel and that the positioning assembly is fixedly connected with the first wheel assembly and hence that the positioning assembly moves along with the first wheel assembly, the first extension cord is connected with the two electrically conducting rings so that power may be fed to the two electrically conducting rings; and
    a second wheel assembly, wherein two fixing rods are provided near the center of an inner surface of the second wheel assembly, a spring is disposed on each of the two fixing rods, an electrically conducting assembly is connected with the two fixing rods, two electrically conducting prongs are provided on the electrically conducting assembly, the second wheel assembly is held in the second holding portion of the main body so that the two electrically conducting prongs of the electrically conducting assembly may press against the first and second electrically conducting rings and the second wheel assembly is fixedly connected with the wheel so that the wheel moves along with the second wheel assembly, the other end of the second extension cord is connected with the two electrically conducting prongs of the electrically conducting assembly so that power in the first extension cord may be fed to the electrical device via the two electrically conducting prongs and the second extension cord.

2. An extension cord holder as in claim 1, wherein a handle is disposed on top of the body so that a user may use the handle to carry the extension cord holder and a holding portion is provided on the front side of the body so that the electrical device may be held in the holding portion.

3. An extension cord holder as in claim 1, wherein an opening is provided on a lower part of the front side, and another opening is provided on a lower part of the rear side, the former opening is an outlet for the second extension cord and the latter opening is an outlet for the first extension cord.

4. An extension cord holder as in claim 1, wherein a knob piece is provided on the outer surface of the first wheel assembly and another knob piece is provided on the outer surface of the second wheel assembly so that a user may use them to rotate the first wheel assembly or the second wheel assembly and to retract the first extension cord or the second extension cord.

5. An extension cord holder as in claim 1, wherein a switch is disposed on the outer surface of the first wheel assembly, the switch is electrically connected with the first extension cord so that the switch may be used to turn on and turn off the power, and a hollow cylinder is provided on the back side of the first wheel assembly so that the first extension cord may be wound around the hollow cylinder.

6. An extension cord holder as in claim 1, wherein a multiple of hollow positioning rods are provided on the back side of the first wheel assembly, a thread is provided on the inner surface of each of these hollow positioning rods, a multiple of hollow rods are provided on the positioning assembly, the hollow rods of the positioning assembly may be aligned with and fixedly connected with the hollow positioning rods through screws so that the positioning assembly may be fixedly connected with the first wheel assembly.

7. An extension cord holder as in claim 1, wherein a multiple of holes are provided on the inner surface of the second wheel assembly and a multiple of threaded holes are provided on the periphery of the wheel, the holes on the inner surface of the second wheel assembly may be aligned with and fixedly connected with the threaded holes on the wheel through screws so that the second wheel assembly may move along with the wheel.

8. An extension cord holder as in claim 1, wherein two insertion pieces are disposed on the two electrically conducting rings and extend through and beyond the bottom side of the positioning assembly so that the two rings may be electrically connected with the first extension cord.

9. An extension cord holder as in claim 1, wherein the electrical device is a lamp.

10. An extension cord holder as in claim 1, wherein the two fixing rods of the second wheel assembly press against the two springs and such compression of the springs ensures that the two electrically conducting prongs have uninterrupted contact with the two electrically conducting rings.

* * * * *